(12) United States Patent
Chou et al.

(10) Patent No.: US 12,026,858 B2
(45) Date of Patent: Jul. 2, 2024

(54) STACKED IMAGE WARP OPERATIONS SYSTEMS AND METHODS

(71) Applicant: Apple Inc., Cupertino, CA (US)

(72) Inventors: Jim C. Chou, San Jose, CA (US); Jian Zhou, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 17/356,219

(22) Filed: Jun. 23, 2021

(65) Prior Publication Data

US 2022/0414840 A1 Dec. 29, 2022

(51) Int. Cl.
*G06T 5/00* (2024.01)
*G06F 3/01* (2006.01)
*G06T 3/00* (2024.01)
*G06T 3/18* (2024.01)
*G06T 5/80* (2024.01)

(52) U.S. Cl.
CPC ............... *G06T 5/80* (2024.01); *G06F 3/013* (2013.01); *G06T 3/18* (2024.01)

(58) Field of Classification Search
CPC ....... G06T 5/006; G06T 3/0093; G06F 3/013; G06F 3/011
See application file for complete search history.

(56) References Cited

U.S. PATENT DOCUMENTS

| | | | |
|---|---|---|---|
| 9,870,605 B2 | 1/2018 | Eldar | |
| 10,055,812 B1* | 8/2018 | Huang | ...................... G06T 3/18 |
| 10,223,761 B2* | 3/2019 | Kwon | ...................... G06T 5/80 |
| 10,572,982 B2* | 2/2020 | Beric | ........................ G06T 5/80 |
| 2012/0039528 A1* | 2/2012 | Lee | ...................... H04N 13/161 |
| | | | 382/162 |
| 2018/0315170 A1* | 11/2018 | Mills | ......................... G06T 3/18 |
| 2021/0035307 A1* | 2/2021 | Shih | ........................ G06T 7/174 |
| 2021/0042890 A1* | 2/2021 | Naidu | ....................... G06T 5/80 |

* cited by examiner

*Primary Examiner* — Bobbak Safaipour
*Assistant Examiner* — Jongbong Nah
(74) *Attorney, Agent, or Firm* — Fletcher Yoder P.C.

(57) ABSTRACT

An electronic device may include an electronic display to display an image based on compensated image data in a panel space. The electronic device may also include image processing circuitry to generate the compensated image data. Further, generating the compensated image data may include determining a first inverse mapping of a pixel grid from the panel space to a rendering space and determining a forward mapping of the pixel grid from the rendering space to the panel space based on the first inverse mapping. The forward mapping may include corrections for multiple different warp operations stacked in a single warp operation. Additionally, the image processing circuitry may apply the forward mapping to input image data to generate the compensated image data.

20 Claims, 8 Drawing Sheets

FIG. 11B RENDERING SPACE

FIG. 11D GROUPED LENS SPACE

FIG. 11A VIRTUAL SPACE

FIG. 11C LENS SPACE

FIG. 12

STACKED IMAGE WARP OPERATIONS SYSTEMS AND METHODS

BACKGROUND

The present disclosure relates generally to image processing and, more particularly, to the combining and stacking of image warp operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

Generally, image data may be associated with an amount of pixel values (e.g., resolution) and distribution of pixel values (e.g., shape and/or density of pixel data layout) corresponding with an image. However, in some instances, it may be desirable to change the amount or distribution of the pixel values to account for different display scenarios. For example, image data may be warped to account for environmental surroundings, display characteristics, and other factors that may distort the perceived image to a viewer. Moreover, multiple warp operations may be performed to account for multiple different sources of distortion. Thus, before being displayed, the image data may be processed to warp the image using the desired changes to the amount or distribution of pixel values such that the perceived image is not distorted. However, at least in some instances, using multiple warp operations may affect perceived image quality of the corresponding image, for example, by introducing image artifacts such as blurring.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To decrease the likelihood of perceivable artifacts such as blurring, multiple warp operations may be stacked together as a single warp operation. Additionally, the single warp operation may increase operational efficiency and/or provide increased processing speed while allowing for real-time warp compensation in response to changes in a viewer's point-of-view, eye relief, and focus.

In general, to display an image, an electronic display may control the luminance and/or color output of its display pixels based on corresponding image data received at a particular resolution. However, in some scenarios, the image to be displayed may, if unaltered, appear distorted when perceived by a viewer due to environmental effects, properties of the display, the viewers point-of-view perspective, image processing warps such as shifts and scaling, and/or other distorting factors. For example, the display may include a screen, opaque or transparent, with curved edges and/or lensing effects that may distort an image if displayed without correction. Furthermore, a viewer's point-of-view relative to the display may alter how the viewer perceives the image. For example, a viewer's gaze may be determined based on the viewer's determined location relative to the display and/or eye-tracking. As such, it may be desirable to change the amount (e.g., resolution) or distribution such as (e.g., shape, relative size, perspective, etc.) of the pixel values to account for different display scenarios. Moreover, multiple warp operations may be performed to account for the multiple different sources of distortion. Thus, before being displayed, the image data may be processed to warp the image such that the perceived image has reduced or no distortion. However, at least in some instances, using multiple warp operations may affect perceived image quality of the corresponding image. For example, performing multiple individual warp operations may include repeated image filtering that, in the aggregate, may produce image artifacts such as blurring.

Additionally, in some embodiments, the correction for some types of warps, such as lens warp and/or point-of-view warp, may change over time, such as based on the viewer's position relative to the display and/or variable image processing parameters. As such, generating parameters for a single warp operation instead of performing each warp individually may reduce processing time, free bandwidth, and/or increase efficiency. Moreover, the reduced processing time may provide for real-time feedback to a user's change in position/point-of-view. Accordingly, to improve image quality and/or increase efficiency, the present disclosure provides techniques for stacking multiple warp operations into a single warp operation. Using the single warp operation may provide a decreased likelihood of perceivable artifacts such as blurring. Additionally, the single warp operation may increase operational efficiency and/or provide increased processing speed and allow for real-time warp compensation in response to changes in a viewer's position and focus.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

To facilitate communicating information, electronic devices often use one or more electronic displays to present visual information via one or more images. Such electronic devices may include computers, mobile phones, portable media devices, tablets, televisions, virtual-reality headsets, and vehicle dashboards, among many others. Additionally or alternatively, an electronic display may take the form of a liquid crystal display (LCD), a light emitting diode (LED) display, an organic light emitting diode (OLED) display, a plasma display, or the like.

In general, to display an image, an electronic display controls the luminance and/or color of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma corrected luma values.

In some scenarios, the image to be displayed may, if unaltered, appear distorted when perceived by a viewer due to environmental effects, properties of the display, the viewers point-of-view perspective, image processing warps such as shifts and scaling, and/or other distorting factors. For example, the display may include a screen, opaque or transparent, with curved edges and/or lensing effects that may distort an image if displayed without correction. Furthermore, a viewer's point-of-view (e.g., as determined based on location and/or eye-tracking) relative to the display may alter how the viewer perceives the image. As such, it may be desirable to change the amount (e.g., resolution) or distribution (e.g., shape, relative size, perspective, etc.) of the pixel values to account for different display scenarios. Moreover, multiple warp operations may be performed to account for the multiple different sources of distortion. Thus, before being displayed, the image data may be processed to warp the image such that the perceived image has reduced or no distortion. However, at least in some instances, using multiple warp operations may affect perceived image quality of the corresponding image. For example, performing multiple individual warp operations may include repeated image filtering that, in the aggregate, may produce image artifacts such as blurring.

Additionally, in some embodiments, the correction for some types of warps, for example lens warp and/or point-of-view warp, may change over time, such as based on the viewer's position relative to the display and/or variable image processing parameters. As such, generating parameters for a single warp operation instead of performing each warp individually may reduce processing time, free bandwidth, and/or increase efficiency. Moreover, the reduced processing time may provide for real-time or enhanced feedback to a user's change in position/point-of-view. Accordingly, to improve image quality and/or increase efficiency, the present disclosure provides techniques for stacking multiple warp operations into a single warp operation. Using the single warp operation may provide a decreased likelihood of perceivable artifacts such as blurring. Additionally, the single warp operation may increase operational efficiency and/or provide increased processing speed and allow for real-time warp compensation in response to changes in a viewer's position and focus.

Figure 1:
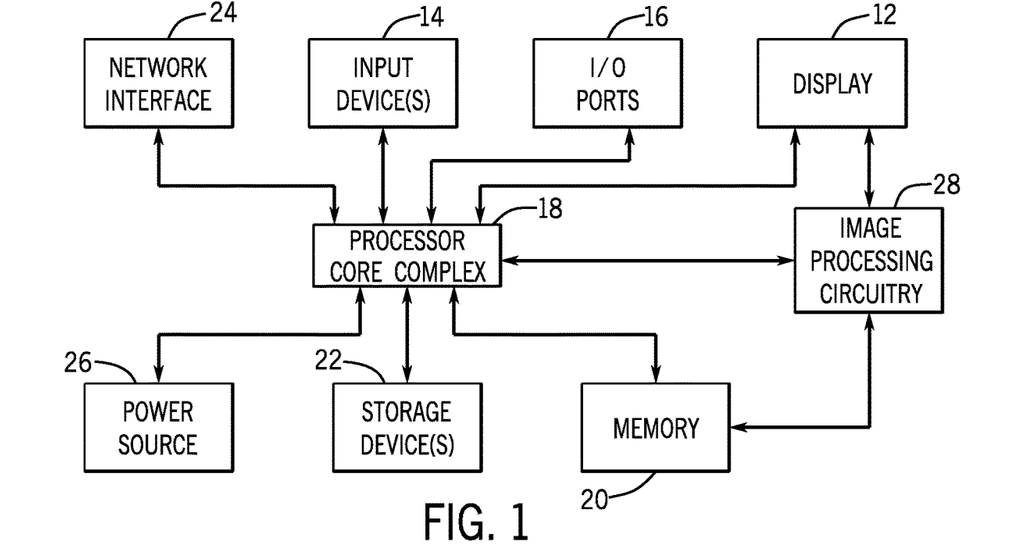
FIG. 1 is a block diagram of an electronic device that includes an electronic display, in accordance with an embodiment.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
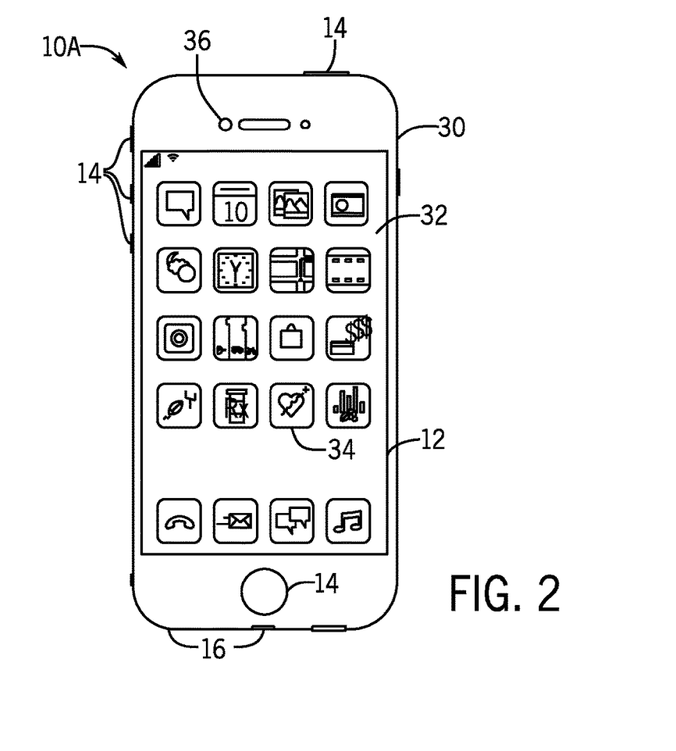
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
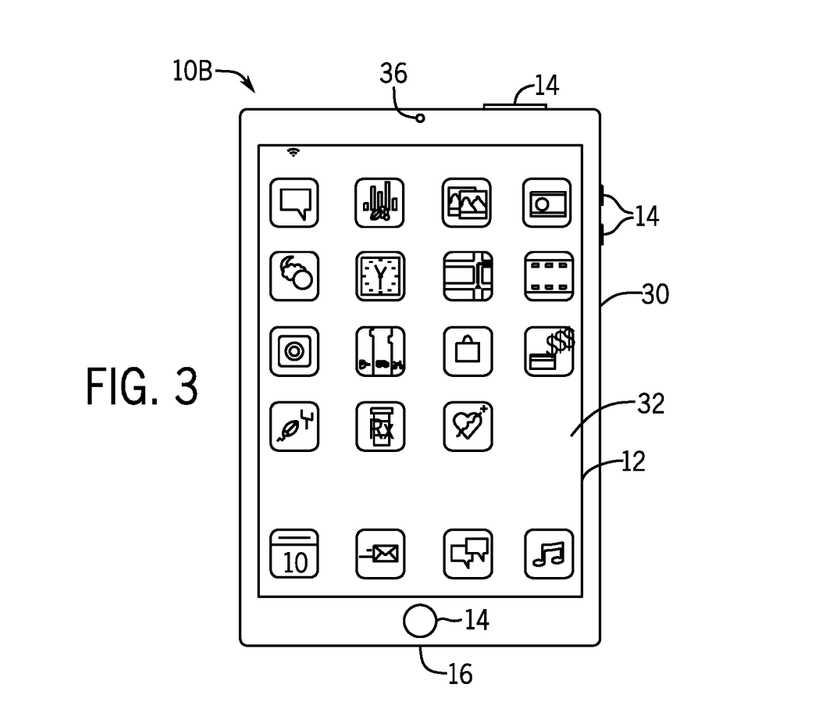
FIG. 3 is another example of the electronic device of FIG. 1 in the form of a tablet device, in accordance with an embodiment.
Figure 4:
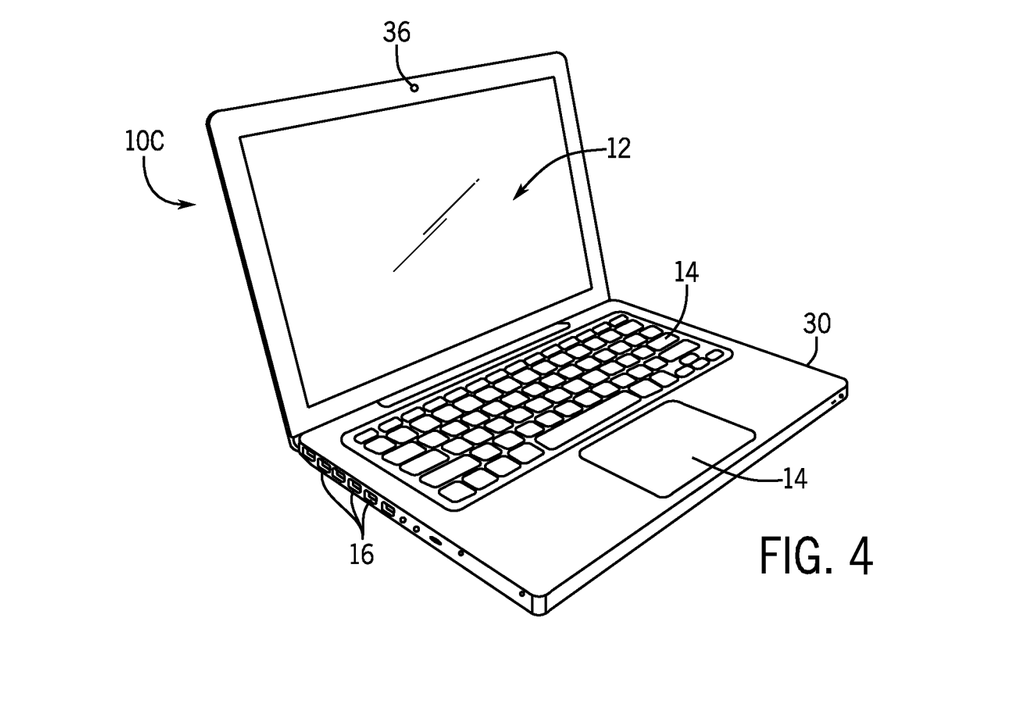
FIG. 4 is another example of the electronic device of FIG. 1 in the form of a computer, in accordance with an embodiment.
Figure 5:
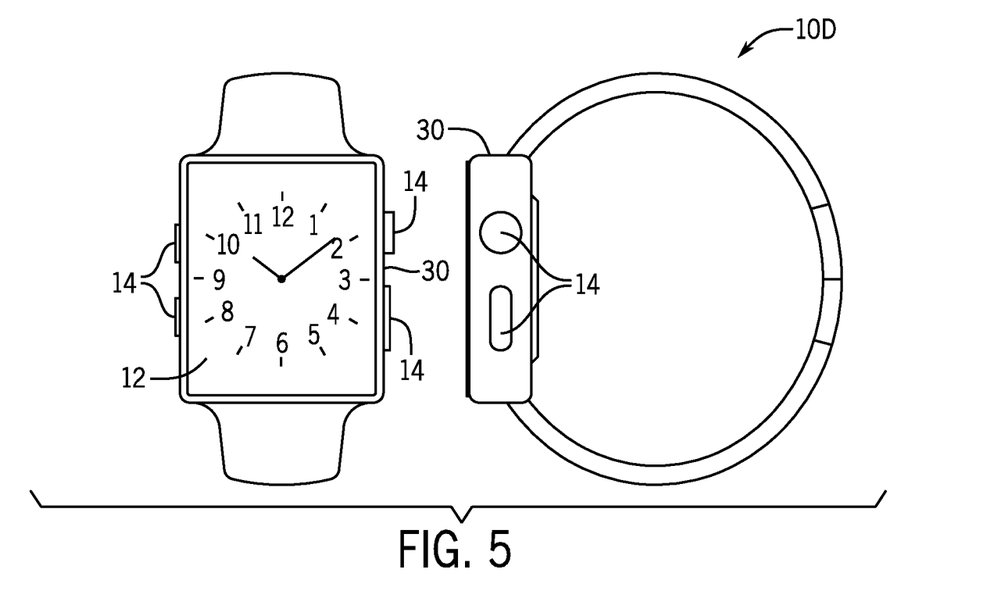
FIG. 5 is another example of the electronic device of FIG. 1 in the form of a watch, in accordance with an embodiment.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
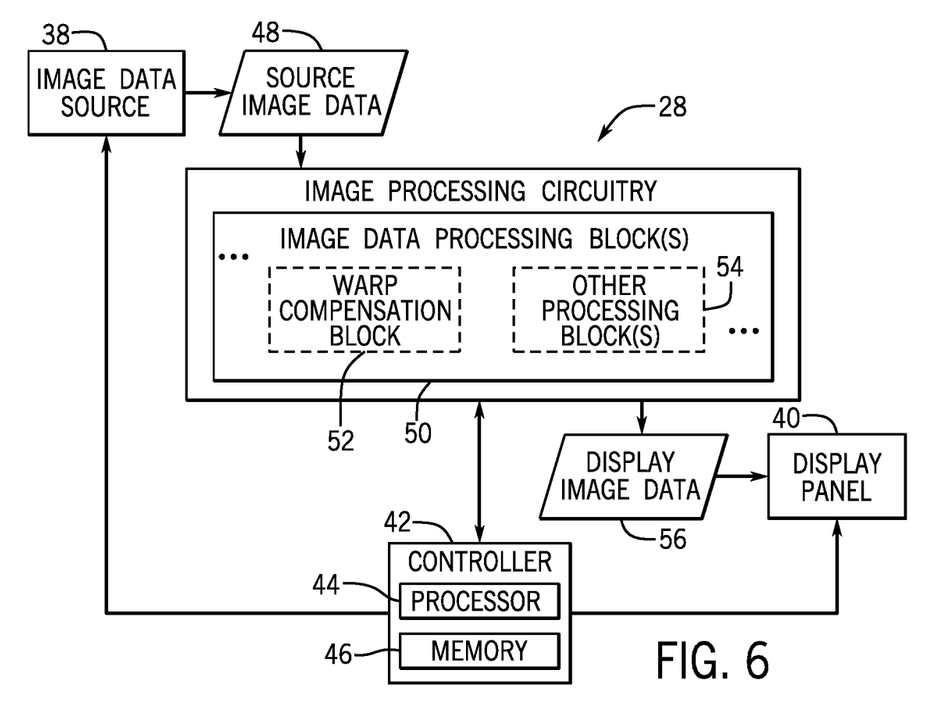
FIG. 6 is a block diagram of a display pipeline of the electronic device of FIG. 1 including a warp compensation block, in accordance with an embodiment.

To help illustrate, a portion of the electronic device 10, including image processing circuitry 28, is shown in FIG. 6. In some embodiments, the image processing circuitry 28 may be implemented by circuitry in the electronic device 10, circuitry in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a liquid crystal display (LCD), a light emitting diode (LED) display, an organic LED (OLED) display, or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 or other image data utilized in the image processing circuitry 28 may indicate target characteristics (e.g., pixel data) corresponding to the desired image using any suitable format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. Furthermore, the format may be fully sampled such as a YCbCr 4:4:4 format or include subsampling such as a YCbCr 4:2:2, YCbCr 4:2:0, or other subsampled formats. In some embodiments, the image data source 38 may be included in the processor core complex 18, the image processing circuitry 28, or a combination thereof. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The data source 38 may include captured images from cameras 36, images stored in memory, graphics generated by the processor core complex 18, or a combination thereof. The image processing circuitry 28 may include one or more sets of image data processing blocks 50 (e.g., circuitry, modules, or processing stages) such as the warp compensation block 52. As should be appreciated, multiple other processing blocks 54 may also be incorporated into the image processing circuitry 28, such as a color management block, a dither block, a rotate block, etc. Furthermore, in some embodiments, multiple warp compensation blocks 52 may be used to provide separate warp operations for different applications of the image processing circuitry 28. For example, different warp compensation blocks 52 may be used for image data from different image data sources 38 (e.g., captured images, graphically generated images, etc.). The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and while the term "block" is used herein, there may or may not be a logical separation between the image data processing blocks 50.

Figure 7:
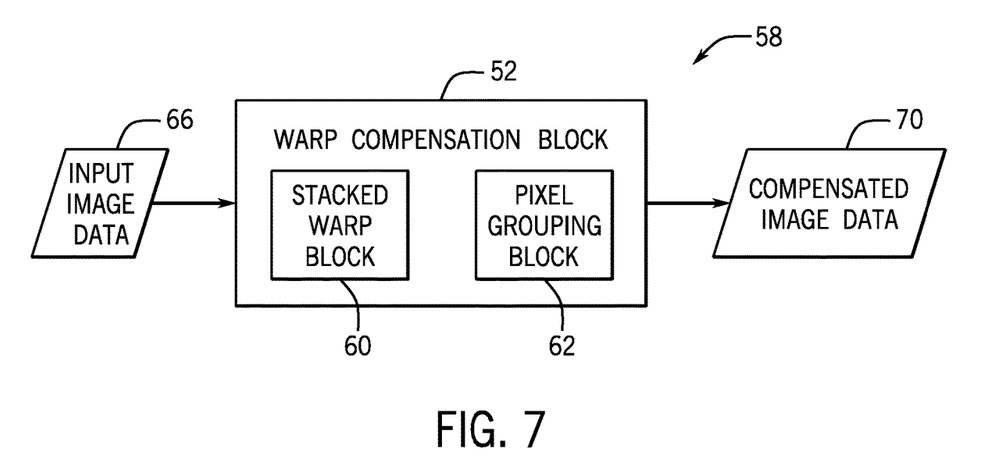
FIG. 7 is a block diagram of a warp compensation block, in accordance with an embodiment.
Figure 8:
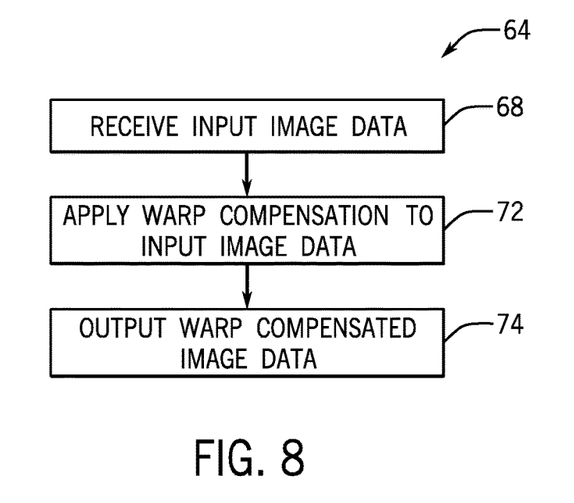
FIG. 8 is a flowchart of an example process performed by a warp compensation block, in accordance with an embodiment.

The warp compensation block 52 may facilitate improving perceived image quality by changing the amount (e.g., resolution) or distribution (e.g., shape, relative size, perspective, etc.) of pixel values to account for different display scenarios during one or more stacked warp operations. To help illustrate, FIG. 7 is a block diagram 58 of a warp compensation block 52 including a stacked warp block 60 and a pixel grouping block 62 and FIG. 8 is a flowchart of an example process 64 performed by the warp compensation block 52. In general, the warp compensation block 52 may receive input image data 66 (process block 68) and generate compensated image data 70 by applying warp compensation to the input image data 66 (process block 72). The warp compensation block 52 may then output the compensated image data 70 (process block 74) to the other processing blocks 54 and/or the display panel 40.

In some embodiments, the image processing circuitry 28 may generally process input image data 66 in a rendering space (e.g., resolution and perspective) and then warp the input image data 66 to a display space output to the display panel 40. As should be appreciated, base or additional image processing may be performed in any determined space. As discussed herein, the warp operations may vary over time and thus be continuously or periodically recalculated every image frame, after a preset or programmable number of image frames, after a preset or programmable period of time, or in response to external changes such as a point-of-view change. As such, in some embodiments, the warp compensation block 52 may determine inverse warps from the display space to the rendering space and compile a forward warp that stacks multiple warps into a singular warp operation.

Figure 9:
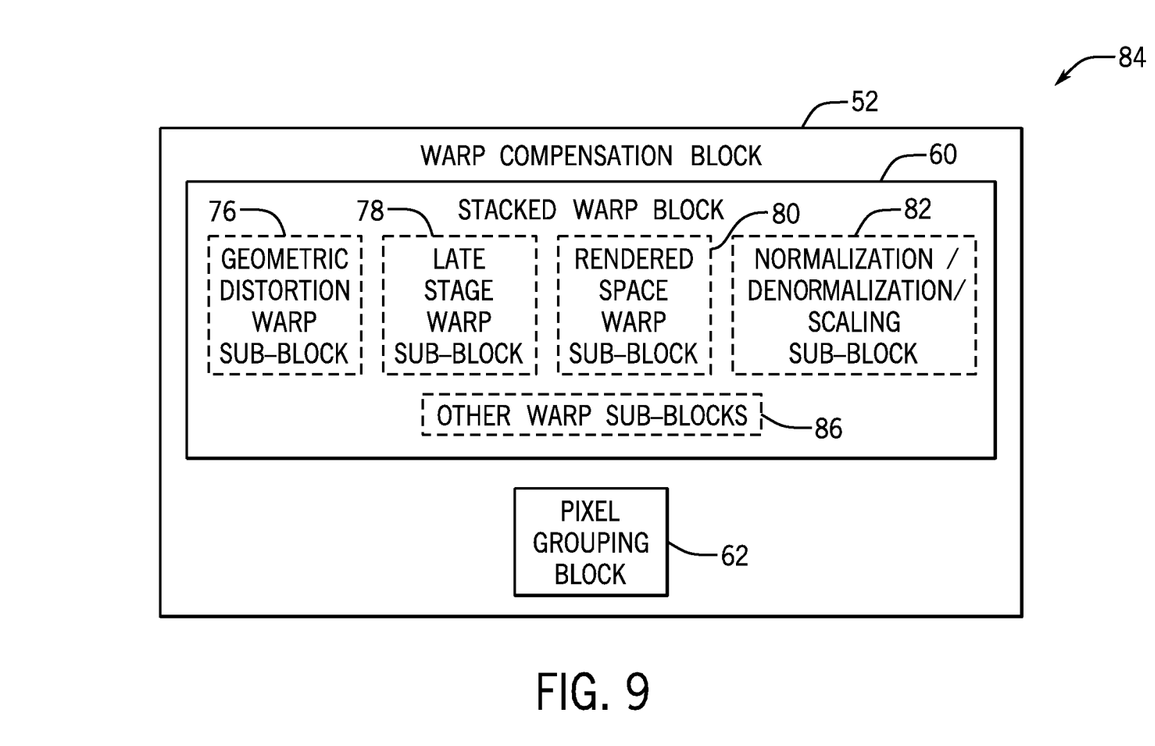
FIG. 9 is a block diagram of a stacked warp block including a geometric distortion warp sub-block, a late stage warp sub-block, a rendered space warp sub-block, and a normalization/denormalization/scaling sub-block, in accordance with an embodiment.

For example, the stacked warp block 60 may include a geometric distortion warp sub-block 76, a late stage warp sub-block 78, a rendered space warp sub-block 80, and a normalization/denormalization/scaling sub-block 82, as shown in the block diagram 84 of FIG. 9. As should be appreciated, other warp sub-blocks 86 may also be accounted for in the stacked warp operation. Moreover, although shown as separate warp sub-blocks, one or more sub-blocks of the stacked warp block 60 may be included in other sub-blocks. In other words, the stages (e.g., space) between the sub-blocks may be theoretical for understanding the multiple warps encapsulated in the stacked warp operation. For example, the image data may not be rendered or calculated in each space theoretically between each sub-block of the stacked warp block 60. Furthermore, conversions (e.g., space conversions) may be included in or separated from the stacked warp operation based on implementation.

In some embodiments, the pixel grouping block 62 may map between a lensed space (e.g., a space corrected for geometric distortion of lens effects) and a lens grouped space (e.g., display space with defined pixel groups). Pixel groups may be used for displaying the compensated image data 70 at different resolutions on different portions of the display panel 40. For example, in some embodiments, the display image data 56 may be foveated (e.g., having varying resolution) based on a focal point of a viewer's viewing of the display 12. In some embodiments, eye tracking may determine where a viewer's focal point is relative to the display 12, and provide increased resolution in areas focused on by the viewer, and stepped down resolution in areas further from the viewer's point of fixation. For example, beyond a threshold distance or solid angle degree from the viewer's focal point, the viewer's ability to perceive resolution may diminish, and thus the resolution may be reduced in such areas without the viewer perceiving a decrease in resolution. The sections of different resolution may be grouped by the pixel grouping block 62. Moreover, in some embodiments, the display 12 may have multiple focal points (e.g., for each eye of the viewer(s)) and multiple groupings throughout the display image data 56.

As stated above, different stacked warp operations may be performed on different source image data 48. Moreover, certain warp operations may be the same across different stacked warp operations such as, in some embodiments, the pixel grouping (e.g., via the pixel grouping block 62). As such, in some embodiments, pixel grouping (e.g., via the pixel grouping block 62) may be calculated separately from the stacked warp operation (e.g., via the stacked warp block 60), for example, to be shared across multiple different stacked warp operations. As should be appreciated, in some embodiments, the pixel grouping block 62 may be incorporated as a sub-block of the stacked warp block 60.

Figure 10:
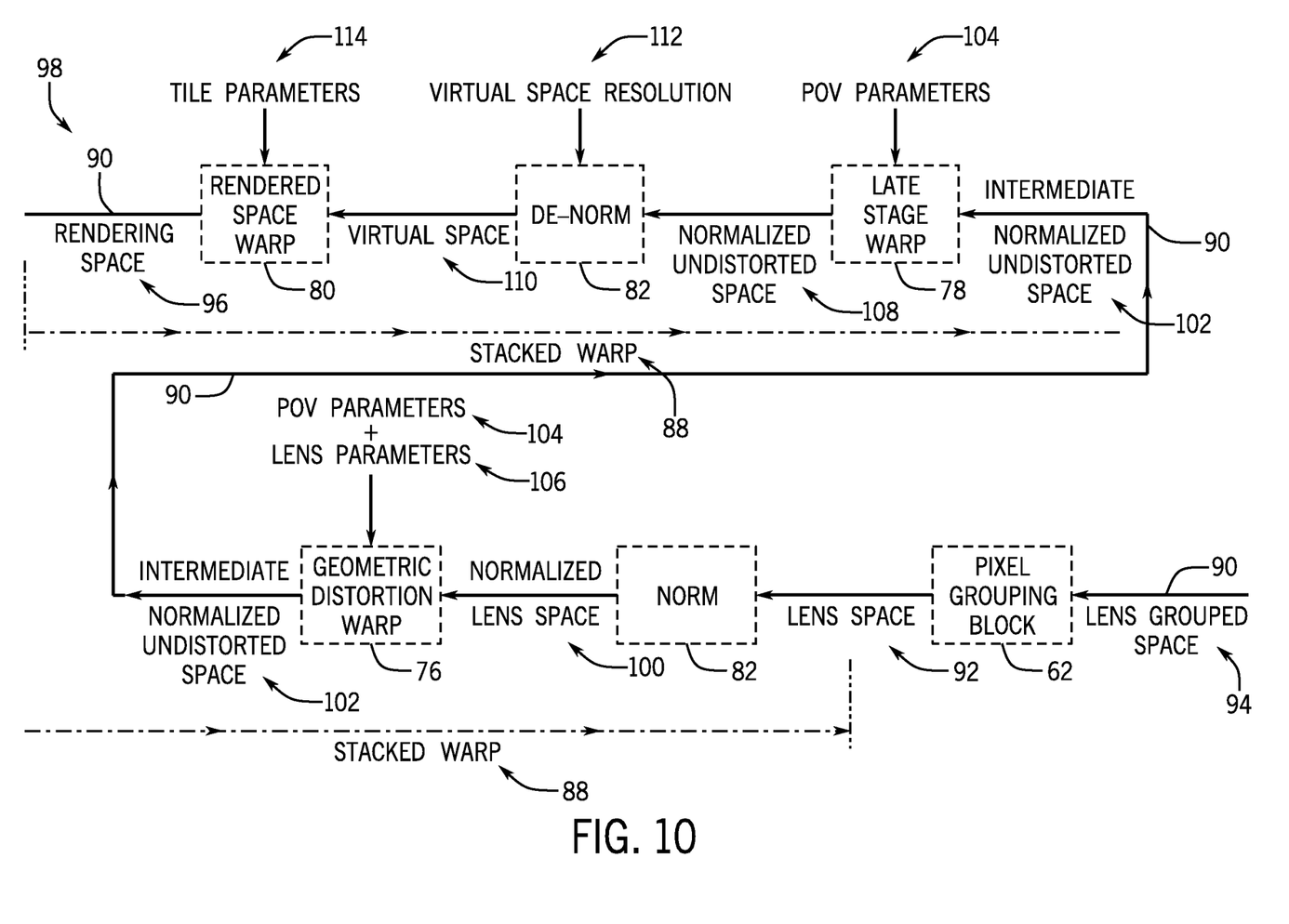
FIG. 10 is a block diagram of an inverse warp path from a panel space to a rendering space and a forward stacked warp operation from the rendering space to the panel space, in accordance with an embodiment.
Figure 11A:
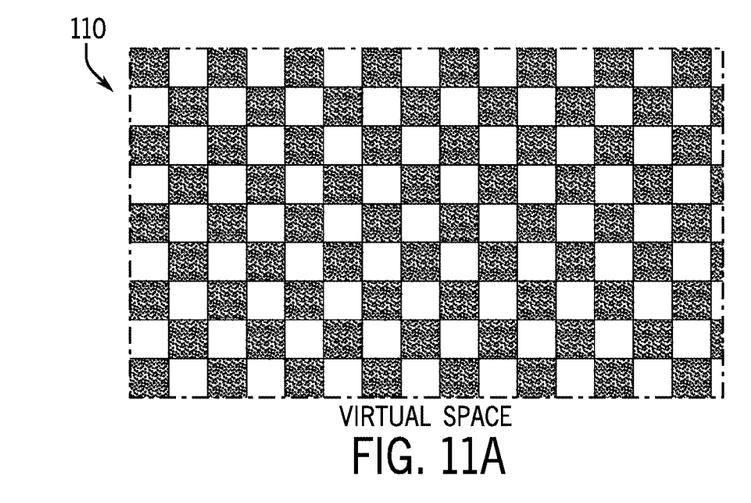
FIG. 11A is an example of a checkerboard pattern in a virtual space, in accordance with an embodiment.
Figure 11B:
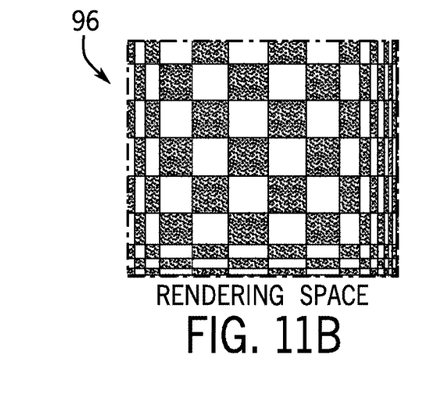
FIG. 11B is an example of a checkerboard pattern in a rendering space, in accordance with an embodiment.
Figure 11C:
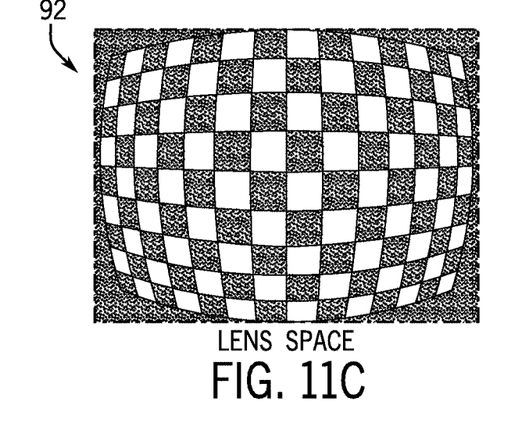
FIG. 11C is an example of a checkerboard pattern in a lens space, in accordance with an embodiment.
Figure 11D:
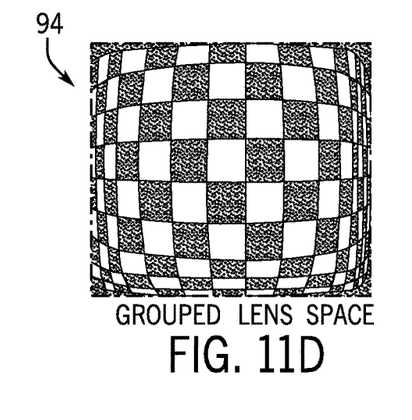
FIG. 11D is an example of a checkerboard pattern in a grouped lens space, in accordance with an embodiment.

In some embodiments, the stacked warp block 60 may determine a stacked warp 88 (e.g., an algorithm, look-up-table, vector mapping, or other construct) to warp to the input image data 66 by backtracking along a path 90 from the panel space (e.g., lens space 92 or lens grouped space 94) to the rendering space 96 (e.g., image processing space) and generating an inverse mapping of the path 90, as in the block diagram 98 of FIG. 10. In some embodiments, the lens grouped space 94 may be converted (e.g., by the pixel grouping block 62) to the lens space 92. As discussed above, the lens grouped space 94 may include pixel groupings of different resolution, for example, based on a viewer's focal point on the display 12. In some embodiments, displaying less than the full resolution in areas that are outside the focal point thresholds may reduce the amount of image processing to generate the display image data 56, speeding up processing time and/or increasing efficiency without introducing a perceivable reduction in resolution.

The lens space 92 may generally be conceptualized as the native resolution of the display panel 40 without pixel groupings. However, in some embodiments, the coordinate space of the display panel 40 may use pixel units (e.g., a pixel grid according to the physical layout of pixels/sub-pixels on the display panel 40) that may not align with grid points of image processing blocks 50 and/or certain warp operations. As such, the normalization/denormalization/scaling sub-block 82 may map the lens space 92 to a normalized lens space 100 for computation of the geometric distortion warp and/or late stage warp. Additionally or alternatively, the normalization or denormalization may include scaling the image data or stacked warp 88 to or from a panel resolution, a source image data resolution, rendered space resolution, and/or a warp computation resolution. Indeed, by performing rendering and/or warp computations in lower resolutions (e.g., using less bits and pixel locations) the rendering and/or warp computations may be determined faster and more efficiently. Moreover, denormalization may occur to reverse the normalization. As should be appreciated, normalization and denormalization, as discussed herein, are in the context of the path 90, and normalization would be denormalization, and vice versa, if considered in the opposite direction of the path 90 (e.g., in the direction of the stacked warp). Further, normalization/denormalization and/or scaling may occur at any point in the path 90 depending on the warp sub-blocks and/or be eliminated or reduced depending on the chosen rendering space 96 and/or panel space (e.g., lens space 92 or lens grouped space 94).

The geometric distortion warp sub-block 76 may map between an intermediate normalized undistorted space 102 and the normalized lens space 100. In general, the distortion warp sub-block 76 may account for physical distortions that may be attributable to the optics of the electronic display 12, the gaze of the viewer (e.g., pupil position), eye relief (e.g., distance from a surface of an optical component of the electronic display 12), and/or the wavelength of emitted light from the electronic display 12. For example, the display panel 40 may be curved and/or include a transparent layer (e.g., glass) that may cause lens effects (e.g., enlargement or shrinkage) of the image to be displayed when perceived by a viewer. Moreover, such optical effects may vary based on the gaze of the viewer and/or the wavelength of light being distorted. As such, point-of-view (POV) parameters 104 and lens parameters 106 may be used to determine the geometric distortion warp. For example, the lens of the electronic display 12, and/or other causes of physical optical distortion, may be estimated by a function of pixel location using the determined POV parameters 104 (e.g., pupil position, eye relief, etc.) as well as static (e.g., curvature of lens, etc.) and/or dynamic (e.g., wavelength of light, etc.) lens parameters 106.

In addition to the geometric distortion warp sub-block 76, the late stage warp sub-block 78 may also use POV parameters 104 to compensate for changes in the POV of the viewer. More specifically, the late stage warp sub-block 78 may map between the intermediate normalized undistorted space 102 and normalized undistorted space 108 by temporally warping a previous frame to a new frame based on the POV parameters 104. For example, because the time between frames is assumed to be relatively small, the warped coordinate space of the new frame may be estimated by the warped coordinate space of the previous frame multiplied by a transformation based on changes in the POV parameters 104 from the previous frame. Reusing information about the previous frame may help reduce computation time and/or increase operational efficiency. Additionally, in some embodiments, the late stage warp sub-block 78 may also help reduce perceived latency by temporally changing the POV (e.g., via synchronous time warp (STW) or asynchronous time warp (ATW)). The reduced perception of latency may also allow for a reduction in frame rate and/or a buffer for dropped frames. Moreover, in some embodiments, the late stage warp sub-block 78 may anticipate changes to the POV parameters based on trends (e.g., continued eye movement) to further increase efficiency.

In some embodiments, the normalized undistorted space 108 may be denormalized (e.g., via the normalization/denormalization/scaling sub-block 82) to a virtual space 110 based on the desired or preset virtual space resolution 112. The virtual space 110 may generally be conceptualized as a rectilinear projection space similar to or in the coordinate space and resolution of the source image data 48. In some embodiments, the virtual space 110 may be of a higher resolution than the normalized undistorted space 108 and/or the rendering space. Further, in some scenarios, the virtual space 110 may be the rendering space 96. However, rendering in the full resolution of the virtual space 110 may be less efficient, particularly when portions of the lens grouped space 94 are at reduced resolution, such as due to foveation. For example, the image processing circuitry 28 may not fetch the source image data 48 at a uniform resolution or render the entire image in the full resolution if the eventual output (e.g., the compensated image data 70 in the lens grouped space 94) has reduced resolution in certain areas. As such, the rendered space warp sub-block 80 may map between the virtual space 110 and the rendering space 96 to enable more efficient rending of foveated images.

In some embodiments, the rendered space warp sub-block 80 may divide the virtual space 110/rendering space 96 into multiple tiles (e.g., groupings/sections) based on tile parameters 114. For example, the tiles may each be associated with different scaling factors in the horizontal and/or vertical directions to map different sections of the virtual space 110 to the rendering space. In some embodiments, the tiling may be correlated to the pixel groupings of the pixel grouping block 62. Further, in some embodiments, fetching of the source image data 48 may occur based on the tile parameters 114 associated with the rendering space 96.

To help further illustrate the coordinate spaces, FIGS. 11A, 11B, 11C, and 11D show a checkerboard pattern illustrated in the virtual space 110, the rendering space 96, the lens space 92, and the lens grouped space 94, respectively. As should be appreciated, the rendering space 96 may be similar to the virtual space 110 with some portions (e.g., tiles) scaled down. Moreover, the lens space 92 may include rounded edges to counter geometric lens distortion, and the lens grouped space 94 may include the rounded edges of the lens space 92 with adjusted/scaled groups of pixels to generate the compensated image data 70.

Each transformation from one coordinate space to another may be approximated by an equation, matrix operation, vector mapping, look-up-table, or other construct. For example, each transformation may be characterized by 1-D, 2-D, or 3-D look-up-tables. Moreover, the transformations may be combined, for example using matrix multiplication, to generate a single transformation for the path 90. Such a transformation may be used to decide what source image data 48 to fetch for image processing. Furthermore, the inverse of the transformation for the path 90 may be used to generate a stacked warp 88 in the forward direction such that the input image data 66 may be warped from the rendering space 96 to the lens space 92 or lens grouped space 94 in a single operation. Additionally, in some embodiments, upsampling (e.g., from a YCbCr 4:2:0 format to YCbCr 4:4:4 format or other suitable upsampling) may be accomplished as part or sequential with the stacked warp 88.

While each space and warp calculation are shown for clarity, some coordinate spaces or sub-blocks representing warp calculations may be skipped, supplanted, added, or incorporated into other calculations. Moreover, as should be appreciated, the types of warp operations stacked into the single warp operation may vary depending on implementation, and the stacked warp block 60 may include other warp sub-blocks 86 or fewer warp sub-blocks. Furthermore, the order of the warp sub-blocks may be altered depending on implementation. For example, the late stage warp sub-block 78 and the geometric distortion warp sub-block 76 may be switched without altering the stacked warp 88.

Figure 12:
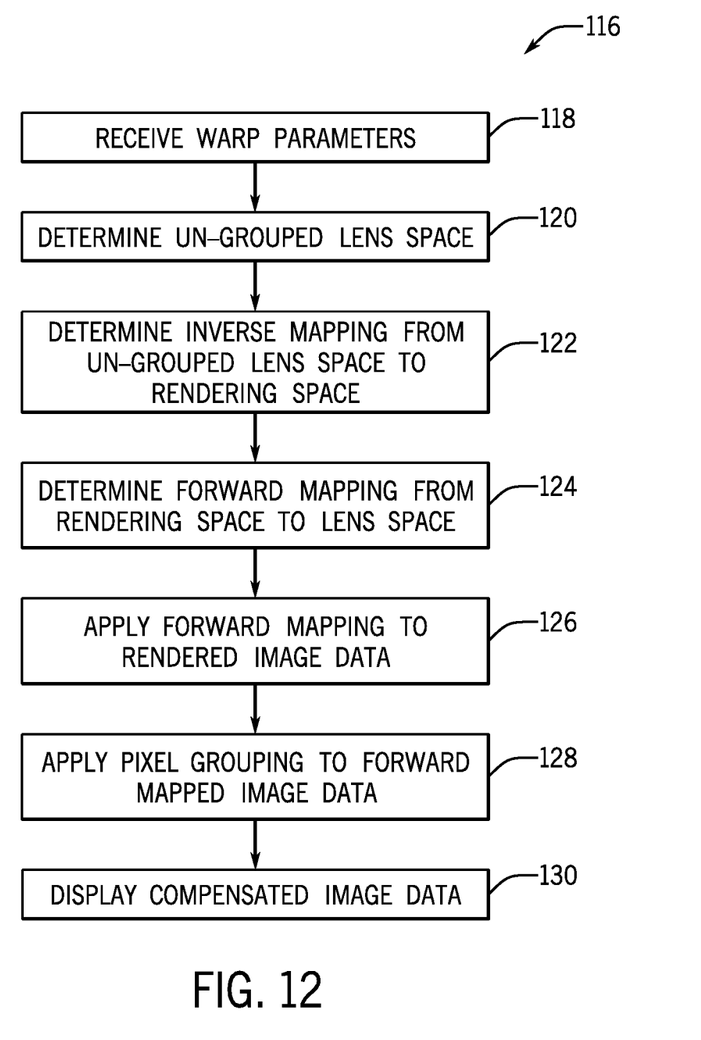
FIG. 12 is a flowchart of an example process for determining and utilizing a stacked warp operation, in accordance with an embodiment.

FIG. 12 is a flowchart of an example process 116 for determining and utilizing a stacked warp operation. For example, image processing circuitry 28 may receive warp parameters (process block 118) such as POV parameters 104, lens parameters 106, a virtual space resolution 112, tile parameters 114, and/or pixel grouping parameters associated with foveation. The warp compensation block 52 may also determine an un-grouped lens space 92 (process block 120). For example, the display space may natively be un-grouped or a grouped lens space 94 may be converted to an un-grouped lens space 92. The image processing circuitry may also determine an inverse mapping from the un-grouped lens space 92 to a rendering space 96 (process block 122). Determining the inverse mapping may include analyzing multiple different warps and/or normalizations/denormalizations and scaling operations and combining them into a single inverse transformation. The image processing circuitry 28 may also determine a forward mapping (e.g., stacked warp 88) from the rendering space 96 to the lens space 92 or grouped lens space 94 (process block 124), for example, by inverting the inverse mapping. The forward mapping of the stacked warp 88 may be applied to rendered image data (e.g., input image data 66) (process block 126) to generate image data in the lens space 92. Pixel groupings may be applied (e.g., via the pixel grouping block 62) to the forward mapped image data to generate compensated image data 70 (process block 128), and the compensated image data 70 may be displayed (process block 130), for example, via the electronic display 12. As such, the image processing circuitry 28, such as the warp compensation block 52, may define a single warp operation that may provide a decreased likelihood of perceivable artifacts such as blurring and/or increase operational efficiency and/or processing speed to allow for real-time warp compensation in response to changes in a viewer's point-of-view, eye relief, and focus.

Although the above referenced flowcharts are shown in a given order, in certain embodiments, process/decision blocks may be reordered, altered, deleted, and/or occur simultaneously. Additionally, the referenced flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
    an electronic display configured to display an image based at least in part on compensated image data in a panel space; and
    image processing circuitry configured to generate the compensated image data, wherein generating the compensated image data comprises:
        determining a first inverse mapping of a pixel grid from the panel space to a rendering space;
        determining a forward mapping of the pixel grid from the rendering space to the panel space based at least in part on the first inverse mapping, wherein the forward mapping comprises corrections for a plurality of warp operations; and
        applying the forward mapping to input image data.

2. The electronic device of claim 1, wherein determining the first inverse mapping comprises:
    determining a plurality of inverse mappings corresponding to inverses of the plurality of warp operations, wherein a second inverse mapping of the plurality of inverse mappings starts in the panel space and a third inverse mapping of the plurality of inverse mappings ends in the rendering space; and
    combining the plurality of inverse mappings into the first inverse mapping.

3. The electronic device of claim 1, wherein the forward mapping comprises an inverse of the first inverse mapping.

4. The electronic device of claim 1, wherein the panel space comprises a lens space warped to counter a geometric distortion corresponding to a lensing effect associated with the electronic display.

5. The electronic device of claim 4, wherein the image processing circuitry comprises a pixel grouping block configured to define a plurality of pixel groups in the lens space to form a lens grouped space.

6. The electronic device of claim 5, wherein the plurality of pixel groups comprise corresponding pixel resolutions based at least in part on a viewing focal point on the electronic display.

7. The electronic device of claim 1, wherein the image processing circuitry comprises normalization circuitry configured to scale and normalize or denormalize the pixel grid as part of the plurality of warp operations.

8. The electronic device of claim 1, wherein the rendering space comprises a rectilinear virtual space warped to include tiles of varying pixel resolution.

9. The electronic device of claim 1, wherein the plurality of warp operations comprise a late stage warp configured to temporally warp the pixel grid of a next frame based at least in part on the pixel grid of a previous frame.

10. The electronic device of claim 1, wherein the plurality of warp operations comprise a late stage warp configured to warp the pixel grid of a next frame based at least in part on point-of-view parameters corresponding to an eye-tracked gaze relative to a position of the electronic display.

11. Image processing circuitry configured to generate a stacked warp operation indicative of a combination of a plurality of warp operations based at least in part on one or more warp parameters, wherein the stacked warp operation warps a pixel grid from a first coordinate space to a second coordinate space, wherein the image processing circuitry comprises:
    geometric distortion warp circuitry configured to determine a first warp operation of the plurality of warp operations, wherein the first warp operation is associated with geometric lensing effects; and
    late stage warp circuitry configured to determine a second warp operation of the plurality of warp operations, wherein the second warp operation is associated with a point-of-view correction relative to a display panel.

12. The image processing circuitry of claim 11, wherein the image processing circuitry is configured to apply the stacked warp operation to input image data to generate compensated image data in a display space.

13. The image processing circuitry of claim 11, wherein the first coordinate space comprises a rendering space and the second coordinate space comprises a lens space.

14. The image processing circuitry of claim 13, wherein the image processing circuitry is configured to generate an inverse stacked warp operation from the lens space to the rendering space based at least in part on the first warp operation and the second warp operation, wherein the stacked warp operation is generated by inverting the inverse stacked warp operation.

15. The image processing circuitry of claim 13, wherein the rendering space is foveated.

16. The image processing circuitry of claim 11, wherein the warp parameters comprise point-of-view parameters and geometric lens parameters.

17. A method comprising:
    receiving, via image processing circuitry, a set of warp parameters;
    determining a first mapping from a display coordinate space to a rendering coordinate space based at least in part on the set of warp parameters, wherein the first mapping comprises a combination of a plurality of warp operations;
    determining a second mapping from the rendering coordinate space to the display coordinate space based on an inverse of the first mapping; and
    applying the second mapping to input image data to generate compensated image data.

18. The method of claim 17, comprising grouping pixels of the display coordinate space to generate a grouped display coordinate space, wherein the grouped display coordinate space comprises a foveated coordinate space.

19. The method of claim 17, wherein the first mapping, the second mapping, or both comprise a 2-dimensional look-up table.

20. The method of claim 17, comprising fetching source image data for image processing based at least in part on the first mapping.

* * * * *